Sept. 12, 1944.   C. W. WYMAN   2,358,198
ELECTRICAL CONTROLLING APPARATUS
Filed July 11, 1942

Inventor:
Charles W. Wyman.
by
Louis A. Wixom.
Atty.

Patented Sept. 12, 1944

2,358,198

UNITED STATES PATENT OFFICE 2,358,198

ELECTRICAL CONTROLLING APPARATUS

Charles W. Wyman, Claremont, N. H., assignor to Sullivan Machinery Company, a corporation of Massachusetts Application July 11, 1942, Serial No. 450,523

8 Claims. (Cl. 175—294)

My invention relates to control means for electrical circuits, and more particularly to means for controlling the connection of an inductive circuit to a power line.

When a circuit is opened, cutting off the flow of current from a power line to an electrical system having an inductance of high value, a voltage surge is created in the system as the flow of current therein decreases. If no means are provided for dissipating the energy stored in the inductive circuits, the voltage surge may cause a breaking down of the insulation and injury to electrical apparatus connected in the system.

In order to prevent the voltage surge from building up to an unsafe value and to dissipate the energy stored in the inductive circuits, it is customary to connect a current conducting means in multiple with the inductive portion of the circuits. It is desirable that the current conducting means offer a very high resistance to the flow of current from the power line so as to avoid wasting of energy, and that it offer a path of low resistance to current resulting from the surge voltage in the inductive circuits in order to keep the voltage low and to dissipate the energy quickly.

An electrical system in which some protective means is usually desirable is one containing a direct current machine, particularly a machine of the shunt type having a field winding possessing high inductance. The dissipation of the energy stored in the field winding may be most advantageously effected by connecting a discharge tube across the winding, the tube being designed to "break down" under a voltage somewhat greater than the line voltage and provide a path of very low resistance across the field. Since the tube does not break down at line voltage, the circuit across the field during operation of the machine is open and no energy is wasted by the connection of this circuit in the system. When the supply of current to the machine is cut off, the surge voltage builds up to the point at which the tube breaks down and short-circuits the field, preventing a further building up of the surge voltage. The energy is rapidly dissipated through the short circuit which is maintained after the tube once breaks down until the voltage drops to a value much below line voltage. If the electrical system were connected to the power line again while the tube is broken down by the surge voltage, the power line would be short-circuited through the tube, causing the tube or some part of the system to be burned out. It is, therefore, desirable that some means be provided for preventing the connection of the system to the power line while energy is being dissipated from the inductive circuit through the tube. By connecting an electrically actuated device in series with the discharge tube, as contemplated in my invention, and causing this device to lock in position a switch controlling the connection of the electrical system to the power line, it will be seen that current will be supplied to this device only when the tube is broken down by the surge voltage, and since this occurs only at the opening of the line switch, the latter may be locked in its open position until the energy in the inductive circuit is dissipated. It will be obvious that other means for preventing controller actuation could be employed instead of a lock, for example, a magnetically controlled disconnecting device between the controller and its operating mechanism.

The main object of my invention is to provide improved means for controlling the connection of an electrical system to a power line. Another object is to provide improved means for preventing the connection of an inductive circuit to a power line immediately after the circuit has been disconnected from the line. Still another object is to provide, in an electrical system containing high inductance, improved means for locking a switch controlling the connection of the system to a power line in its open position, immediately after the switch has been moved from its closed to its open position, until energy stored in the system has become dissipated. Another object is to provide improved means actuated by the energy in an inductive circuit, when the circuit is disconnected from a power line, for preventing the connection of the circuit to the power line again until the energy has become dissipated. Still another object is to provide with an inductive circuit having a discharge tube connected across it, improved means actuated by the energy in the circuit when the latter is disconnected from a power line for preventing the connection of the circuit to the power line while the energy is being dissipated through the tube. These and other objects will appear more fully in the course of the following description.

In the accompanying drawing there is shown for purposes of illustration one form which my invention may assume in practice. In this drawing.

In the illustrative embodiment of my invention I have shown a machine, generally designated 1, having a frame 2 supporting a motor of the compound type, and control means, generally designated 4, therefor.

Figure 1:
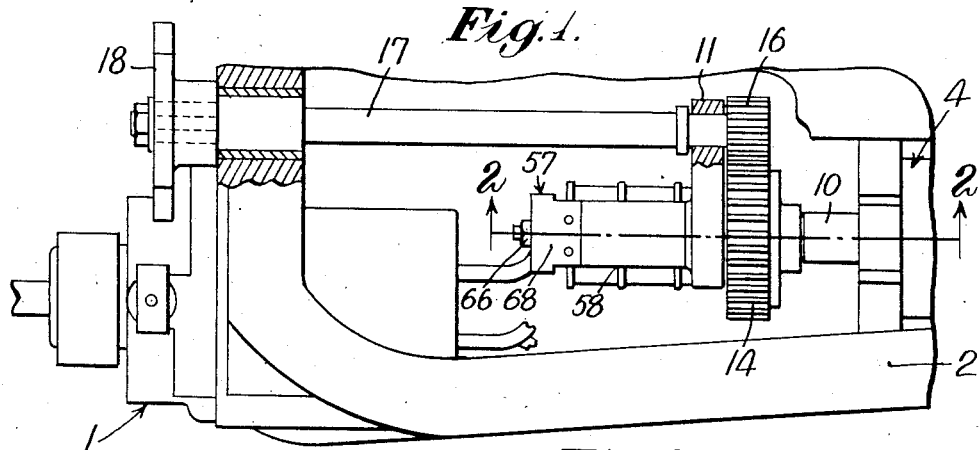
Fig. 1 is a plan view, with parts broken away, of a machine having a reverse switch with which my improved control means is adapted for use.
Figure 2:
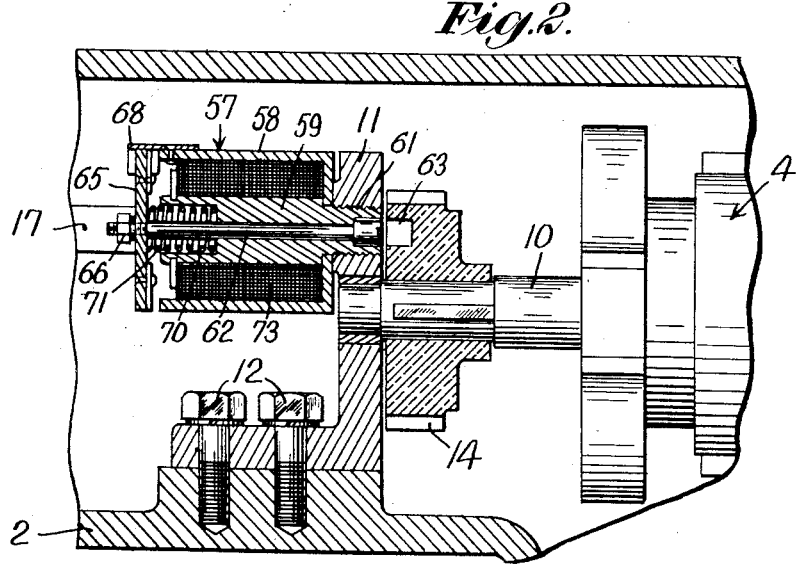
Fig. 2 is an enlarged vertical sectional view taken on the line 2—2 of Fig. 1.
Figure 3:
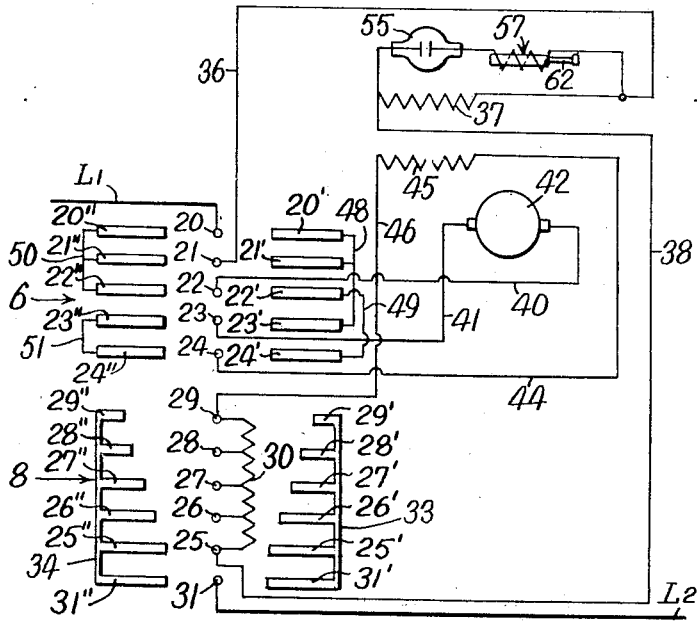
Fig. 3 is a wiring diagram showing the connection of my control means in the electrical system for controlling the operation of the reverse switch illustrated.

The control means comprises, as shown in Fig. 3, a reverse switch, generally designated 6, having an element which is rotatable in opposite directions from a neutral position for connecting the motor in opposite directions to a power line. Associated with the switch is a controller, generally designated 8, having an element which rotates with the rotatable switch element for varying the amount of resistance in certain of the motor circuits, thereby controlling the speed of the motor. The rotatable elements of the switch and the controller are fixed to a shaft 10 extending longitudinally of the machine frame 2, as shown in Figs. 1 and 2. The shaft 10 is journaled at one end in a bracket 11 fixed to the machine frame, as by bolts 12, and is rotatably supported at its other end by any suitable means, not shown. Keyed to the shaft 10 is a gear 14, and meshing with the gear 14 is a pinion 16 fixed to a shaft 17 which is journaled in the bracket 11 and the machine frame 2. Attached to the outer end of the shaft 17 is a manual controlling element 18 whereby the pinion 16 may be rotated for effecting a rotation of the gear 14 and the rotatable switch and controller elements. Obviously other switch and controller operating means could be employed.

The reverse switch includes a series of stationary contact elements 20, 21, 22, 23 and 24, into contact with which there are adapted to be moved, on rotation of the rotatable element of the reverse switch in one direction or the other from its neutral position, either the set of contacts 20', 21', 22', 23', and 24', or the set of contacts 20'', 21'', 22'', 23'' and 24''. The controller 8 includes stationary contact elements 25, 26, 27, 28 and 29 connected at different points to a resistance 30 and adapted to have moved into contact with them, on rotation of the rotatable controller element in one direction or the other from its neutral position, consecutively, the contacts 25', 26', 27', 28' and 29' or the contacts 25'', 26'', 27'', 28'' and 29''. Another stationary contact element 31 is adapted to be engaged by a contact 31' or by a contact 31'' when the contact elements 25' or 25'' of the controller engage contact 25. The controller contacts bearing primed and double primed numbers are connected respectively by conductors 33 and 34, so that the resistance 30 is shunted in steps as the controller element is rotated and the contact element 29 is connected to the contact 31 through a path of decreasing resistance.

A power line has one of its lines $L_1$ connected to the contact element 20 and the other of its lines $L_2$ connected to the contact element 31. The switch contact element 21 is connected by a conductor 36 to one end of a shunt field winding 37 of the motor, and the other end of the winding 37 is connected by a conductor 38 to the contact element 25 of the controller element. The switch contact elements 22 and 23 are connected respectively by conductors 40 and 41 to opposite sides of the motor armature 42. The switch contact element 24 is connected by a conductor 44 to one end of a series field winding 45 for the motor, and the other end of the winding 45 is connected by a conductor 46 to the contact element 29 of the controller. The switch contacts 20', 21' and 23' are connected by a conductor 48, and the contacts 22' and 24' are connected by a conductor 49. The contacts 20'', 21'' and 22'' are connected by a conductor 50, and the contacts 23'' and 24'' are connected by a conductor 51.

As the operator manipulates the controlling element 18 to effect rotation of the gear 14 in a direction to move the switch and controller contact carrying elements to the left, as viewed in Fig. 3, the contact elements 20, 21, 22, 23 and 24 and the controller contact elements 25 and 31 are engaged simultaneously by their respective cooperating single-primed contacts. A current then flows from the line $L_1$ through the contact 20, 20' to the conductor 48 where it divides, part passing through the contacts 21', 21, the conductor 36, the shunt field winding 37, the conductor 38, the contacts 25, 25', the conductor 33, and the contacts 31', 31 to the line $L_2$, and part flowing through contacts 23', 23, conductor 41, the motor armature 42, conductor 40, contacts 22, 22', conductor 49, contacts 24', 24, conductor 44, series field winding 45, conductor 46, resistance 30, contacts 25, 25', conductor 33, and contacts 31', 31 to the line $L_2$. The motor will then be caused to operate and may be speeded up by rotating the shaft 10 to bring the contacts 26', 27', 28' and 29' successively into engagement with the contact elements 26, 27, 28 and 29.

If the reverse switch and controller elements are rotated in the opposite direction from their neutral positions, the left hand set of contacts, those bearing double primed members, of Fig. 3 are moved to the right and engage the stationary contact elements. Current then flows from line $L_1$ through the shunt field winding 37 in the same direction as it did when the switch was in its opposite closed position, but the flow of current through the armature 42 is in the opposite direction, though it also passes in the same direction through the series field 45, and the motor is caused to run in the opposite direction.

Whenever the reverse switch and controller elements are rotated from either one of their closed positions to an open position, a surge voltage is produced in the shunt field winding 37, varying directly with the inductance therein. The inductance of the shunt coil in an electric motor may be such as to produce a surge voltage sufficient to break down its insulation if no means are provided for dissipating the energy stored in the coil. In order to dissipate the energy in the shunt field winding, I have connected a circuit containing a discharge tube 55 across the winding. The discharge tube 55 is open at line voltages but "breaks" down under a voltage somewhat higher than line voltage and short circuits the shunt winding 37. This tube used will break down in either direction so that regardless of which way the motor is connected to the lines, the protective device will be effective. Obviously with a device always to be connected in one way to the power lines, a different tube could be used. In structure, the tube as shown may consist of an evacuated, gas filled bulb with similar, spaced carbon electrodes. After the discharge tube has been broken down by the surge voltage it remains broken down until the surge voltage drops to a value far below that at which the tube broke down, and if the switch could be closed in either direction while the tube was broken down the power line would be short-circuited through the tube 55 and parts of the system would be destroyed because the line voltage would push too much current through it.

Under ordinary conditions the line switch 6 would probably never be deliberately closed before the surge voltage had dropped to a value at which the discharge tube ceased to be broken down, but, to insure that such closing of the switch will not take place, suitable means to prevent controller movement while the tube is broken down is provided according to my invention, and I herein illustrate as an appropriate arrangement an electrically actuated switch-locking device, generally designated 57, connected in the circuit with the discharge tube 55.

The locking device 57, as shown, comprises a casing 58 containing a central core 59 extending through an opening in one end of the casing and threaded at 61 into an opening in the bracket 11 for holding the device in a stationary position relative to the machine frame 2. Extending longitudinally through the core 59 is a plunger 62 adapted to be received at one of its ends in a recess 63 in the gear 14 when the switch 6 is moved to its open position. The other end of the plunger extends through an opening in an iron or steel plate 65 and is fixed to the latter as by a nut 66. Guide members 68 are fixed to the casing 58 in any suitable manner for guiding the plate 65 for movement axially of the core 59. Received within a recess 70 in the core 59 is a coil spring 71 surrounding the plunger 62 and acting between the inner face of the plate 65 and the bottom of the recess 70 for holding normally the plunger 62 in its retracted position out of engagement with the gear 14. Surrounding the core 59 is a coil 73 connected in the circuit with the discharge tube 55 across the shunt winding 37 as shown in Fig. 3. When a current flows through the coil 73, a magnetic field is established for pulling the plate 65 toward the coil against the force of the spring 71.

It will be seen that a current will flow through the coil 73 only when the discharge tube 55 breaks down under the surge voltage produced in the winding 37 on the opening of the line switch 6. At this time the recess 63 in the gear 14 is located opposite the inner end of the plunger 62, and the magnetic force produced by the current flowing through the coil causes the plunger to be forced into the recess 63 and effect a locking of the switch 6 in its open position until the discharge tube ceases to be broken down by the surge voltage. When the flow of current through the coil 73 is cut off, the plunger 62 is moved to its retracted position by the spring 71, thereby releasing the gear 14 for rotation in either direction to effect a closing of the line switch.

As a result of this invention there is provided improved means for controlling the closing of a circuit to supply current to an inductive circuit. It will be noted that the control means provided is constructed of simple and rugged units. The coil of the locking device will be designed to hold the locking plunger in its locking position until the surge voltage produced drops to a value at which the discharge tube is restored to its normal condition.

While I have in this application specifically described one form which the invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In combination, an electrical system including an inductance, a source of electrical energy, means for controlling the supply of energy from said source to said electrical system and movable to a position for interrupting the supply of energy to said system, circuit means shunting said inductance and offering a high resistance at the voltage of said source of energy and a substantially low resistance at surge voltages induced in said inductance, said circuit means including a device operative on the flow of current therethrough produced by surge voltages in said inductance for locking said controlling means in its energy-interrupting position.

2. In combination, an electrical system including an inductance, a source of electrical energy, means for controlling the supply of energy from said source to said electrical system and movable to a position for interrupting the supply of energy to said system, circuit means shunting said inductance and including a discharge tube operative at a voltage exceeding the voltage at said source of energy for providing a path of low resistance across said inductance, said circuit means also including a device operative on the flow of current therethrough for locking said controlling means in its energy-interrupting position.

3. In combination, an electrical system including an inductance, a source of electrical energy, means for controlling the supply of energy from said source to said electrical system and movable to a position for interrupting the supply of energy to said system, means operable when said controlling means is in its energy-interrupting position for locking the latter in such position, circuit means shunting said inductance and including a discharge tube operative at a voltage exceeding the voltage at said source of energy for providing a path of low resistance across said inductance, said circuit means also including an electromagnet connected in series with said discharge tube and operative on the flow of current therethrough for actuating said locking means.

4. In combination, an electrical system including an inductance, a power line for supplying electrical energy to said electrical system, a switch for controlling the connection of said power line to said electrical system, means operable when said switch is in its open position for locking the latter in such position, circuit means shunting said inductance and including a device operative at a voltage exceeding the voltage across said power line for providing a path of low resistance across said inductance, said circuit means also including electrically operated means forming part of said locking means and operative on the flow of current therethrough for locking said switch in its open position.

5. In combination, an electrical system including an inductance, a source of electrical energy, means for controlling the supply of energy from said source to said electrical system and movable to a position for interrupting the supply of energy to said system, circuit means shunting said inductance and offering a high resistance at the voltage of said source of energy and a substantially low resistance at surge voltages induced in said inductance, said circuit means including a device operative on the flow of current therethrough produced by surge voltages in said inductance for effecting a locking of said controlling means in its energy-interrupting position.

6. In combination, a motor having a shunt field, a reverse switch, a power line, circuit means shunting said shunt field and including a device operative at a voltage exceeding the voltage across said power line for providing a path of low resistance across said inductance, and means including an operating coil in said circuit means and operative irrespective of the previous direction of motor rotation for preventing operation of said reverse switch to effect restarting of said motor during substantial current flow through said circuit means.

7. In combination, an electrical system including an inductance, a source of electrical energy, a switch for controlling the supply of electrical energy from said source to said system, circuit means shunting said inductance and offering a high resistance at voltages produced when energy is supplied to said system and a low resistance at higher voltages, and means for locking said switch against movement while current produced by the higher voltages flows through said circuit, said last mentioned means including an element responsive only to the current through said circuit produced by the higher voltages.

8. In combination, an electrical system including an inductance, a source of electrical energy, a switch for controlling the supply of electrical energy from said source to said system, circuit means shunting said inductance and including a discharge tube operative at a voltage exceeding that produced when energy is supplied to said system for providing a path of low resistance across said inductance, and means for locking said switch against movement while current flows through said discharge tube, said last mentioned means including electrically operated means connected in said shunt circuit.

CHARLES W. WYMAN.